(12) United States Patent
Xiao et al.

(10) Patent No.: US 11,502,507 B2
(45) Date of Patent: Nov. 15, 2022

(54) POWER CONVERTER WITH GROUND FAULT DETECTION FUNCTION AND FAULT DETECTION METHOD

(71) Applicant: Delta Electronics,Inc., Taoyuan (CN)

(72) Inventors: Peng Xiao, Taiwan (CN); Hongwei Xiao, Taiwan (CN); Hongjian Gan, Taiwan (CN); Jianping Ying, Taiwan (CN)

(73) Assignee: Delta Electronics, Inc., Taoyuan (CN)

( * ) Notice: Subject to any disclaimer, the term of this patent is extended or adjusted under 35 U.S.C. 154(b) by 21 days.

(21) Appl. No.: 16/361,929

(22) Filed: Mar. 22, 2019

(65) Prior Publication Data

US 2019/0312425 A1    Oct. 10, 2019

(30) Foreign Application Priority Data

Apr. 4, 2018   (CN) .......................... 201810301724.8

(51) Int. Cl.
*H02H 7/12* (2006.01)
*H02H 7/122* (2006.01)
*H02M 1/32* (2007.01)
*H02M 5/451* (2006.01)

(52) U.S. Cl.
CPC ............ *H02H 7/1216* (2013.01); *H02H 7/12* (2013.01); *H02H 7/1227* (2013.01); *H02M 1/32* (2013.01); *H02M 5/451* (2013.01)

(58) Field of Classification Search
USPC .................................................. 361/23, 42
See application file for complete search history.

(56) References Cited

U.S. PATENT DOCUMENTS

| | | | |
|---|---|---|---|
| 6,927,955 B2 | 8/2005 | Suzui et al. | |
| 8,688,301 B2* | 4/2014 | Kitanaka | H02P 29/027 701/22 |
| 8,791,704 B2 | 7/2014 | Mynam et al. | |

(Continued)

FOREIGN PATENT DOCUMENTS

| | | |
|---|---|---|
| CN | 1645705 A | 7/2005 |
| CN | 102288866 A | 12/2011 |

(Continued)

OTHER PUBLICATIONS

The IN1OA issued Sep. 30, 2020 by the IN Office.

(Continued)

*Primary Examiner* — Danny Nguyen
(74) *Attorney, Agent, or Firm* — Qinghong Xu

(57) ABSTRACT

A ground fault detection method for a power converter is provided, including: measuring, by a voltage sensor, a first voltage and a second voltage respectively, and converting the first voltage and the second voltage into a first digital voltage signal and a second digital voltage signal; receiving, by a controller, the first digital voltage signal and the second digital voltage signal, extracting a corresponding feature quantity of the first voltage and a corresponding feature quantity of the second voltage according to the first digital voltage signal and the second digital voltage signal; and further determining a type of the ground fault of the power converter and locating a ground fault; and when the power converter has a ground fault, shutting down the power converter.

17 Claims, 10 Drawing Sheets

(56) References Cited

U.S. PATENT DOCUMENTS

| | | | |
|---|---|---|---|
| 8,981,785 B2 | 3/2015 | Wahlroos et al. | |
| 9,007,790 B2 | 4/2015 | Dillig et al. | |
| 9,046,560 B2 | 6/2015 | Li | |
| 9,383,399 B2 | 7/2016 | Wei et al. | |
| 9,612,269 B2 | 4/2017 | Wei et al. | |
| 2006/0056206 A1* | 3/2006 | Kifuku | H02M 1/32 363/15 |
| 2013/0293988 A1 | 11/2013 | Li | |
| 2015/0130379 A1* | 5/2015 | Ando | H02P 6/24 318/400.21 |
| 2016/0028342 A1 | 1/2016 | Furukawa et al. | |
| 2017/0131340 A1 | 5/2017 | Tallam et al. | |

FOREIGN PATENT DOCUMENTS

| | | | |
|---|---|---|---|
| CN | 103135038 A | 6/2013 |
| CN | 103424696 A | 12/2013 |
| CN | 103792465 A | 5/2014 |
| CN | 103823148 A | 5/2014 |
| CN | 105548755 A | 5/2016 |
| CN | 106080207 A | 11/2016 |
| CN | 106199315 A | 12/2016 |
| CN | 106370960 A | 2/2017 |
| CN | 106680660 A | 5/2017 |
| JP | 2016116432 A | 6/2016 |
| JP | 2017229172 A | 12/2017 |

OTHER PUBLICATIONS

The 2nd Office Action dated Jul. 15, 2021 for CN patent application No. 201810301724.8.
The 1st Office Action dated Jan. 21, 2021 by the CNIPA.

\* cited by examiner

| Fault Type | A Phase-To-Ground Voltage | C Phase-To-Ground Voltage |
|---|---|---|
| Grounding at the positive terminal of the bus capacitor | Average Value <-0.3 *0.5Udc | Average Value <-0.3*0.5Udc |
| Grounding at the negative terminal of the bus capacitor | Average Value >0.3*0.5Udc | Average Value >0.3*0.5Udc |
| Grounding at A phase | Effective Value <0.8*U | Effective Value >1.2*U |
| Grounding at B phase | Effective Value >1.2*U | Effective Value >1.2*U |
| Grounding at C phase | Effective Value >1.2*U | Effective Value <0.8*U |

Fig.4

POWER CONVERTER WITH GROUND FAULT DETECTION FUNCTION AND FAULT DETECTION METHOD

CROSS REFERENCE

This application is based upon and claims priority to Chinese Patent Application No. 201810301724.8, filed on Apr. 4, 2018, the entire contents thereof are incorporated herein by reference.

TECHNICAL FIELD

The present disclosure relates to the field of electrical systems, and in particular to a power converter having a ground fault detection function and a fault detection method.

BACKGROUND

Medium voltage converters are widely used in medium and high voltage and high power applications such as iron and steel metallurgy, petrochemicals and rail transit due to their large output capacity. Since the medium voltage frequency converter and the motor are generally connected by a long cable which is prone to ground fault. The ground fault is mostly caused by cable insulation aging or physical damage. The traditional method for detecting ground faults in converters is to determine the occurrence of ground faults by detecting ground leakage current. However, on the one hand, the ground leakage current signal is very weak, and especially when the converter operates at a low frequency and in a high impedance grounding state, there might be a detection dead zone. On the other hand, the method cannot effectively locate the fault location, which brings inconvenient for fault inspection.

Therefore, there is a demand for a ground fault detection method that can reduce the detection dead zone and effectively locate the ground fault to facilitate fault inspection.

SUMMARY

In order to solve one or more problems existing in the prior art, the present disclosure provides a power converter having a ground fault detecting function and a fault detecting method.

According to one aspect of the present disclosure, there is provided a ground fault detection method for a power converter, the power converter including a rectifier circuit, a bus capacitor, and an inverter circuit; the rectifier circuit being electrically coupled to a switch group, and the switch group being electrically coupled to a power grid; the bus capacitor being electrically coupled between the rectifier circuit and the inverter circuit; AC phases of the inverter circuit being electrically coupled to a motor; the power converter further including a voltage sensor and a controller; an input terminal of the voltage sensor being electrically coupled to the AC phases of the inverter circuit; an output terminal of the voltage sensor being electrically coupled to the controller; and the method including: measuring, by the voltage sensor, a first voltage and a second voltage, respectively, and converting the first voltage and the second voltage into a first digital voltage signal and a second digital voltage signal; receiving, by the controller, the first digital voltage signal and the second digital voltage signal, extracting a corresponding feature quantity of the first voltage and a corresponding feature quantity of the second voltage according to the first digital voltage signal and the second digital voltage signal; and determining a type of a ground fault of the power converter and locating a ground fault according to the feature quantity of the first voltage and the feature quantity of the second voltage; and when the power converter has a ground fault, shutting down the power converter.

In an embodiment, the AC phases of the inverter circuit includes a first phase, a second phase and a third phase; the voltage sensor includes a voltage dividing circuit, a differential circuit and an AD conversion circuit; the voltage dividing circuit is respectively connected to two of the first phase, the second phase and the third phase, to respectively measure the first voltage and the second voltage, and output a first divided voltage and a second divided voltage; the differential circuit receives the first divided voltage and the second divided voltage, and performs common mode noise suppression processing, and respectively outputs a first differential voltage signal and a second differential voltage signal; the AD conversion circuit is coupled to the differential circuit, receives the first differential voltage signal and the second differential voltage signal and performs digital encoding on the first differential voltage signal and the second differential voltage signal, and outputs the first digital voltage signal and the second digital voltage signal.

In an embodiment, the feature quantity of the first voltage includes an average value or an effective value of the first voltage, and the feature quantity of the second voltage includes an average value or an effective value of the second voltage.

In an embodiment, receiving, by the controller, the first digital voltage signal and the second digital voltage signal, extracting a corresponding feature quantity of the first voltage and a corresponding feature quantity of the second voltage according to the first digital voltage signal and the second digital voltage signal includes: calculating, by the controller, an average value of the first digital voltage signal to obtain the average value of the first voltage; or calculating, by the controller, a root mean square of the first digital voltage signal to obtain the effective value of the first voltage; and calculating, by the controller, an average value of the second digital voltage signal to obtain the average value of the second voltage; or calculating, by the controller, a root mean square of the second digital voltage signal to obtain the effective value of the second voltage.

In an embodiment, determining a type of a ground fault of the power converter and locating a ground fault according to the feature quantity of the first voltage and the feature quantity of the second voltage includes: determining and locating an AC ground fault according to the effective value of the first voltage and the effective value of the second voltage; or determining and locating a DC ground fault according to the average value of the first voltage and the average value of the second voltage.

In an embodiment, the voltage dividing circuit is coupled to the first phase and the third phase, respectively, and determining and locating an AC ground fault according to the effective value of the first voltage and the effective value of the second voltage includes: when the effective value of the first voltage is smaller than a first preset value, and the effective value of the second voltage is larger than a second preset value, determining and locating that the AC ground fault has occurred at the first phase of the inverter circuit; or when the effective value of the first voltage is larger than the second preset value, and the effective value of the second voltage is larger than the second preset value, determining and locating that the AC ground fault has occurred at the second phase of the inverter circuit; or when the effective value of the first voltage is larger than the second preset value, and the effective value of the second voltage is smaller than the first preset value, determining and locating that the AC ground fault has occurred at the third phase of the inverter circuit.

In an embodiment, determining and locating a DC ground fault according to the average value of the first voltage and the average value of the second voltage includes: when the average value of the first voltage and the average value of the second voltage are both smaller than a third preset value, determining and locating that the DC ground fault has occurred at a positive terminal of the bus capacitor; or when the average value of the first voltage and the average value of the second voltage are both larger than a fourth preset value, determining and locating that the DC ground fault has occurred at a negative terminal of the bus capacitor.

Alternatively and additionally, the method may further include outputting, by the controller, a trip signal to turn off the switch group.

As an example, the voltage sensor may be a dual-input voltage sensor, and wherein the digital encoding may be Manchester encoding.

According to a second aspect of the present disclosure, there is provided a power converter having a ground fault detection function, including a rectifier circuit, a bus capacitor, and an inverter circuit; the rectifier circuit being electrically coupled to a switch group, and the switch group being electrically coupled to a grid; the bus capacitor being electrically coupled between the rectifier circuit and the inverter circuit; AC phases of the inverter circuit being electrically coupled to a motor, and the AC phases of the inverter circuit including a first phase, a second phase and a third phase; the power converter further including a voltage sensor and a controller; an input terminal of the voltage sensor being electrically coupled to two of the first phase, the second phase and the third phase; and an output terminal of the voltage sensor being electrically coupled to the controller, wherein the voltage sensor is configured to measure a first voltage and a second voltage, respectively, and convert the first voltage and the second voltage into a first digital voltage signal and a second digital voltage signal; the controller is configured to receive the first digital voltage signal and the second digital voltage signal, extract a corresponding feature quantity of the first voltage and a corresponding feature quantity of the second voltage according to the first digital voltage signal and the second digital voltage signal; and determine a type of a ground fault of the power converter and locate a ground fault according to the feature quantity of the first voltage and the feature quantity of the second voltage; and when the power converter has the ground fault, shut down the power converter.

In an embodiment, the voltage sensor includes a voltage dividing circuit, a differential circuit, and an AD conversion circuit, the voltage dividing circuit is respectively connected to two of the first phase, the second phase and the third phase, to respectively measure the first voltage and the second voltage, and output a first divided voltage and a second divided voltage; the differential circuit is configured to receive the first divided voltage and the second divided voltage, and perform common mode noise suppression processing, and respectively output a first differential voltage signal and a second differential voltage signal; the AD conversion circuit is coupled to the differential circuit, and configured to receive the first differential voltage signal and the second differential voltage signal and perform digital encoding on the first differential voltage signal and the second differential voltage signal, and output the first digital voltage signal and the second digital voltage signal.

As an example, the feature quantity of the first voltage includes an average value or an effective value of the first voltage, and the feature quantity of the second voltage includes an average value or an effective value of the second voltage.

In an embodiment, the controller is configured to calculate an average value of the first digital voltage signal to obtain the average of the first voltage, or calculate a root mean square of the first digital voltage signal to obtain the effective value of the first voltage;

the controller is configured to calculate an average value of the second digital voltage signal to obtain the average of the second voltage, or calculate a root mean square of the second digital voltage signal to obtain the effective value of the second voltage; and the controller is configured to determine and locate an AC ground fault according to the effective value of the first voltage and the effective value of the second voltage; or determine and locate a DC ground fault according to the average value of the first voltage and the average value of the second voltage.

In an embodiment, the voltage dividing circuit is coupled to the first phase and the third phase, respectively, when the effective value of the first voltage is smaller than a first preset value, and the effective value of the second voltage is larger than a second preset value, the controller is configured to determine and locate that the AC ground fault has occurred at the first phase of the inverter circuit; or when the effective value of the first voltage is larger than the second preset value, and the effective value of the second voltage is larger than h second preset value, the controller is configured to determine and locate that the AC ground fault has occurred at the second phase of the inverter circuit; or when the effective value of the first voltage is larger than the second preset value, and the effective value of the second voltage is smaller than the first preset value, the controller is configured to determine and locate that the AC ground fault has occurred at the third phase of the inverter circuit.

In an embodiment, when the average value of the first voltage and the average value of the second voltage are both smaller than a third preset value, the controller is configured to determine that the DC ground fault has occurred at a positive terminal of the bus capacitor; or when the average value of the first voltage and the average value of the second voltage are both larger than a fourth preset value, the controller is configured to determine that the DC ground fault has occurred at a negative terminal of the bus capacitor.

In an embodiment, after the power converter is shut down, the controller may be configured to output a trip signal to disconnect the switch group.

In an embodiment, the voltage sensor may be a dual-input voltage sensor.

In an embodiment, the controller includes a feature quantity extracting unit, a logic determining unit, and a pulse processing unit; the feature quantity extracting unit is configured to extract the corresponding feature quantity of the first voltage and the corresponding feature quantity of the second voltage according to the first digital voltage signal and the second digital voltage signal; the logic determining unit is configured to determine the type of the ground fault of the power converter and locate the ground fault according to the feature quantity of the first voltage and the feature quantity of the second voltage; and when the ground fault of the power converter has occurred, the pulse processing unit is configured to shut down the power converter.

It should be understood that both the foregoing general description and the following detailed description are exemplary and explanatory only and are not restrictive of the disclosure.

BRIEF DESCRIPTION OF THE DRAWINGS

Exemplary embodiments of the present disclosure will be described in detail below with reference to the accompanying drawings, from which the above and other objects, features and advantages of the present disclosure will become more apparent.

FIG. 4 is a logic chart of determining a type of ground fault and a location of a ground fault by a controller, according to one embodiment;

DETAILED DESCRIPTION

Figure 1:
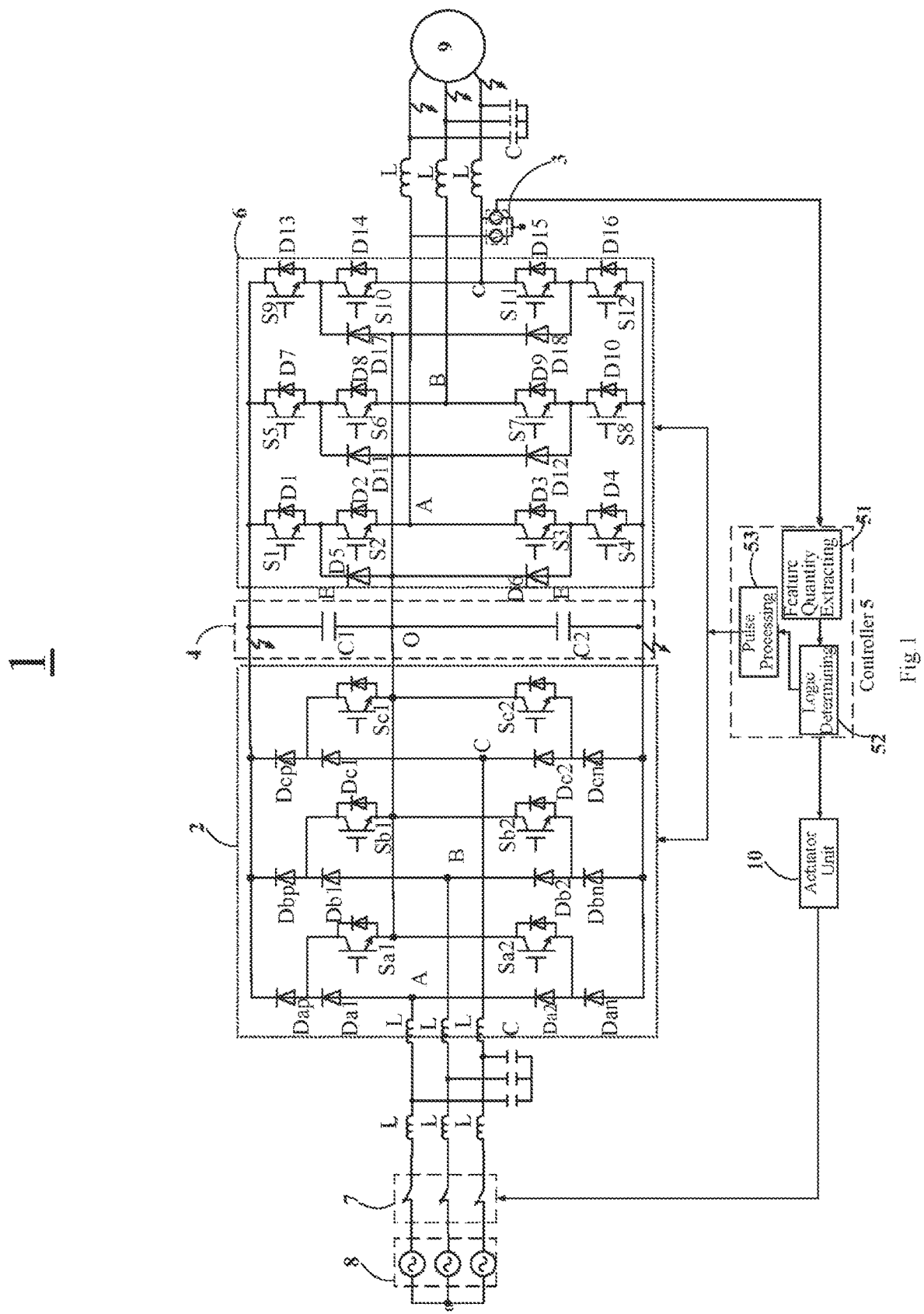
FIG. 1 is a schematic block diagram of ground fault detection in an exemplary unidirectional power converter.

Exemplary embodiments of the present disclosure will now be described more fully with reference to the accompanying drawings. It is to be understood that the exemplary embodiments herein are merely provided to assist the understanding of the present disclosure and are not intended to limit the present disclosure. The embodiments are provided to make the description of the present disclosure more comprehensive and complete, and to convey the concept of the exemplary embodiments to those skilled in the art. The drawings are only schematic representations of the present disclosure and are not necessarily drawn to scale. The same reference numerals in the drawings denote the same or similar parts, and the repeated description thereof will be omitted.

Furthermore, the features, structures, or advantages described herein may be combined in any suitable manner in one or more embodiments. In the following description, numerous specific details are set forth to facilitate fully understanding of the embodiments of the present disclosure. However, one skilled in the art will recognize that one or more of the specific details may be omitted, or may be substituted by other equivalent methods, means, devices, steps, etc. For the sake of brevity, structures, methods, devices, implementations or operations that are well known in the art will not be described again.

A power transmission system includes a power converter and a motor. Three AC phases of the power converter are connected to the three phases of the motor through corresponding cable. Power transmission systems are generally divided into large current grounding systems and small current grounding systems. For a large current grounding system, if a single-phase ground fault (that is, a single AC phase-to-ground fault) occurs, the phase voltage of the grounded AC phase is applied to the low-impedance loop due to the small neutral-to-ground impedance, to generate a large current which can trigger an over-current protection trip. Therefore, it is easy to detect it. For a small current grounding system, if a single-phase ground fault occurs, due to the large neutral-to-ground impedance, ground current is so small that a conventional over-current protection cannot be triggered. For the small current grounding system, ground fault usually does not cause large over-current phenomena immediately, and the power transmission system can still continue to operate. If the ground fault is not handled timely or not handled properly, the power transmission system may continue to operate with ground fault, which may lead to expansion of the fault, which may in turn changes from a single-phase ground fault to a phase-to-phase fault, causing serious damage to the power transmission system. Therefore, there is a demand for a fault detection technology suitable for small current grounding systems.

At present, fault detection methods suitable for small current grounding systems may be roughly classified into two types: current method and voltage method.

In the current method, when a ground fault occurs in the power transmission system, a zero sequence voltage will appear at the ungrounded neutral point of the three-phase motor in the power transmission system and a zero sequence current flowing through the neutral point. Therefore, the detection of the ground fault can be achieved by detecting the zero sequence current.

The difficulty of current method detection lies in that the zero sequence current flowing through the neutral point is the difference of the capacitance current of the power transmission system and the current of the distributed capacitance of the cable to the ground. When the zero sequence current is small and the detection signal is very weak, the zero sequence current has low signal-to-noise ratio, which may cause unstable current waveform of the capacitor. Therefore, the ground fault and the grounding resistance are in an unstable state. In order to reduce the error in measuring the zero sequence current, a high-precision zero sequence current transformer, even a current transformer capable of measuring the mA-level zero sequence current has to be used. In order to make the wiring cable transmitting the zero sequence current have anti-interference ability, a shielded cable may be used as the wiring cable.

In the voltage method, the basic detection principle of the voltage method is to determine whether a ground fault has occurred in the power transmission system according to the zero sequence voltage. This method cannot locate the ground fault and can only be combined with the zero sequence current measurement to locate the ground fault. Although the zero sequence voltage detection method can determine whether the power transmission system has a ground fault, it cannot directly locate the specific fault phase and the fault pole, which brings inconvenience to maintain the ground fault.

The object of the present disclosure is to provide a ground fault detection method, which can not only detect the type of ground fault, but also accurately locate the ground fault, such as the fault phase and the fault pole, and shorten the time for maintain the ground fault.

In the present disclosure, a voltage sensor is installed on any two of the three AC phases (for example, any two of the A phase, the B phase, and the C phase) of the power converter, to detect two corresponding AC phase-to-ground voltages (i.e. phase voltages) of the power converter. The voltage sensor processes the two detected phase voltages and outputs the two digital voltage signals. Then, the controller receives the two digital voltage signals, and extract feature quantities corresponding to the two phase voltages from the two digital voltage signals, so as to determine the ground fault type and locate the ground fault. In a preferred embodiment, the voltage sensor measures two AC phase-to-ground voltages of the power converter, and the controller may calculate another AC phase-to-ground voltage according to the two AC phase-to-ground voltages. The controller may also calculate the line voltages between the three AC phases in the power converter according to the two phase voltages, without adding an additional sensor to measure the line voltage. That is, the voltage sensor applied for detecting the line voltages between the three AC phases in the power converter may be the same voltage sensor applied for detecting the ground fault. In another preferred embodiment, the voltage sensor applied for detecting the line voltages between the three AC phases in the power converter may be different from the voltage sensor applied for detecting the ground fault.

Some embodiments of the present disclosure are particularly applicable to ground fault detection of small current grounding systems, such as ground fault detection on cables connecting the power converter to the three-phase motor which has an ungrounded neutral point.

The ground faults are mainly divided into AC ground faults and DC ground faults. One type of AC ground faults is a single-phase ground fault. When an AC phase of the power converter is grounded, that is, a single-phase ground fault occurs, assuming that the ground impedance is zero, the phase voltage of the grounded AC phase is close to zero, and the phase voltage of the ungrounded AC phase is increased to the line voltage, then the decreased phase voltage of the AC phase with ground fault and the increased phase voltage of the AC phase with no ground fault are related to the ground impedance. Therefore, the single-phase ground fault may cause effective values of the three AC phase-to-ground voltages to be increased or decreased. The effective values of the AC phase-to-ground voltages may be selected as the feature quantities of the voltages for determining the AC ground fault and locating the ground fault. The DC ground fault includes a ground fault at the positive or at the negative terminal of the bus capacitor (i.e., the DC bus capacitor). When a ground fault occurs at the positive terminal of the bus capacitor, the average value of the AC phase-to-ground voltage of the power converter will have a large negative bias voltage. Similarly, when a ground fault occurs at the negative terminal of the bus capacitor, the average value of the AC phase-to-ground voltage of the power converter will have a large positive bias voltage. According to the above rule, the average value of the AC phase-to-ground voltage may be selected as the feature quantity of the voltage for determining the DC ground fault and locating the ground fault.

Figure 2:
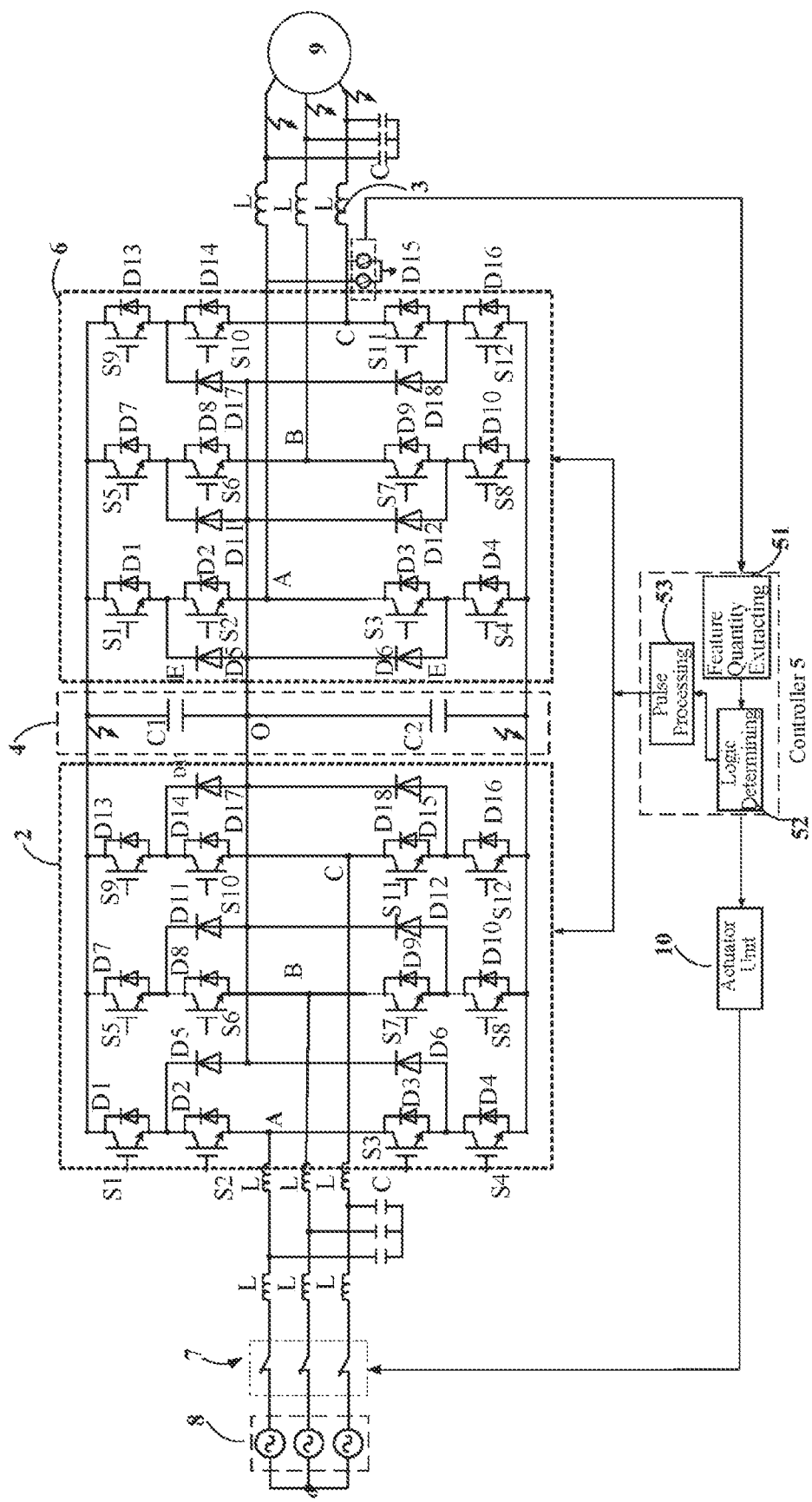
FIG. 2 is a schematic block diagram of ground fault detection in an exemplary bidirectional power converter.

FIG. 1 is a schematic block diagram of ground fault detection in an exemplary unidirectional power converter. Power is transmitted from a grid to a motor through a unidirectional power converter to achieve unidirectional transmission of the power. FIG. 2 is a schematic block diagram of ground fault detection in an exemplary bidirectional power converter. Power may be transmitted from the grid to the motor through the bidirectional power converter, or may be transmitted from the motor to the grid through the bidirectional power converter to achieve bidirectional transmission of the power. FIGS. 1 and 2 show examples of the topology and connection relationship of the power converter and the voltage sensor 3 according to the present disclosure. As shown in FIGS. 1 and 2, the power converter 1 includes a rectifier circuit 2, a bus capacitor 4, and an inverter circuit 6. One side of the rectifier circuit 2 is electrically coupled to a switch group 7, and the switch group 7 is electrically coupled to the grid 8. The bus capacitor 4 is electrically coupled between the other side of the rectifier circuit 2 and one side of the inverter circuit 6. The other side of the inverter circuit 6 is electrically coupled to the motor 9. The other side of the inverter circuit 6 includes three AC phases, such as A phase, B phase, and C phase, which are electrically coupled to three connecting wires of the motor 9 respectively through three connecting cables. The motor 9 is a three-phase motor.

Also shown in FIGS. 1 and 2 is the voltage sensor 3, i.e., the location of the voltage detection. The two input terminals of the voltage sensor 3 are electrically connected to the two AC phases of the inverter circuit 6 in the power converter (taking the A phase and the C phase for example in FIGS. 1 and 2) respectively, and the output terminal of the voltage sensor 3 is connected to the controller 5. It should be understood that the connection relationship herein is exemplary, and the voltage sensor may be connected to any two of the three AC phases of the inverter circuit, and the present disclosure is not limited to the illustrated example.

The two input terminals of the voltage sensor 3 are electrically connected to two of the three AC phases of the inverter circuit of the power converter 1, and the output terminal of the voltage sensor 3 is connected to the controller 5. The voltage sensor 3 measures two of the three AC phase-to-ground voltages of the inverter circuit 6, for example, the first voltage and the second voltage, and converts the first voltage and the second voltage into a first digital voltage signal and a second digital voltage signal respectively. The controller 5 receives the first digital voltage signal and the second digital voltage signal, and extracts a corresponding feature quantity of the first voltage and a corresponding feature quantity of the second voltage according to the first digital voltage signal and the second digital voltage signal. Then, the controller 5 determines the type of the ground fault of the power converter 1 and locates the ground fault, according to the feature quantity of the first voltage and the feature quantity of the second voltage. When the power converter 1 has a ground fault, the control signal output by the controller 5 may be blocked and the power converter 1 is shut down. Specifically, the controller 5 includes a feature quantity extracting unit 51, a logic determining unit 52 and a pulse processing unit 53. The feature quantity extracting unit 51 receives the first digital voltage signal and the second digital voltage signal output by the voltage sensor 3, and extracts the corresponding feature quantity of the first voltage and the corresponding feature quantity of the second voltage according to the first digital voltage signal and the second digital voltage signal. The logic determining unit 52 receives the feature quantity of the first voltage and the feature quantity of the second voltage to determine the type of the ground fault and locate the ground fault. When it is determined that the three AC phases or the bus capacitor of the power converter 1 have a ground fault, logic determining unit 52 outputs a fault signal, so that the pulse processing unit 53 blocks the controller 5 to output a control signal, and shut down the power converter 1. FIG. 4 is a logic chart of determining the type of ground fault and locating the ground fault by the controller, according to one embodiment.

Figure 10:
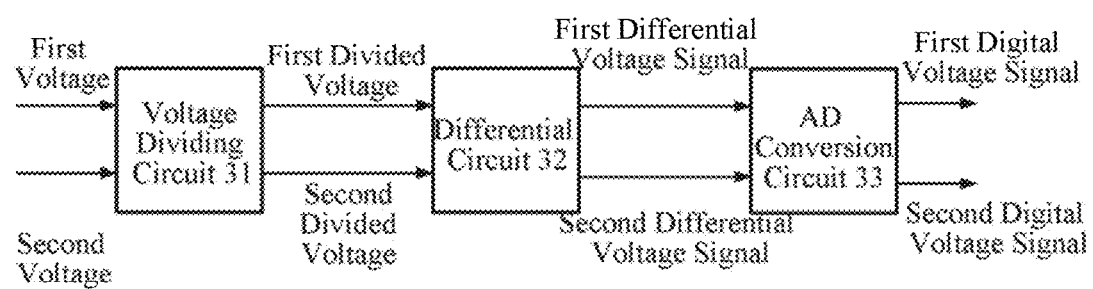
FIG. 10 is a schematic block diagram of a voltage sensor according to an exemplary embodiment.

FIG. 10 is a schematic block diagram of a voltage sensor according to an exemplary embodiment. The voltage sensor may include a voltage dividing circuit 31, a differential circuit 32, and an AD conversion circuit 33. As shown in FIG. 10, the voltage dividing circuit 31 is respectively connected to two of the three AC phases of the inverter circuit in the power converter 1, to respectively measure the first voltage and the second voltage, and outputting the first divided voltage and the second divided voltage. The differential circuit 32 receives the first divided voltage and the second divided voltage, and performs common mode noise suppression processing, and outputs the first differential voltage signal and the second differential voltage signal, respectively. The AD conversion circuit 33 is connected to the differential circuit 32, receives and digitally encodes the first differential voltage signal and the second differential voltage signal, and outputs a first digital voltage signal and a second digital voltage signal to the controller 5.

The present disclosure will be described below with reference to the embodiments and the accompanying drawings. It is to be understood that the details of the following embodiments are merely for the purpose of understanding the present disclosure and are not intended to limit the scope of the present disclosure.

Figure 3:
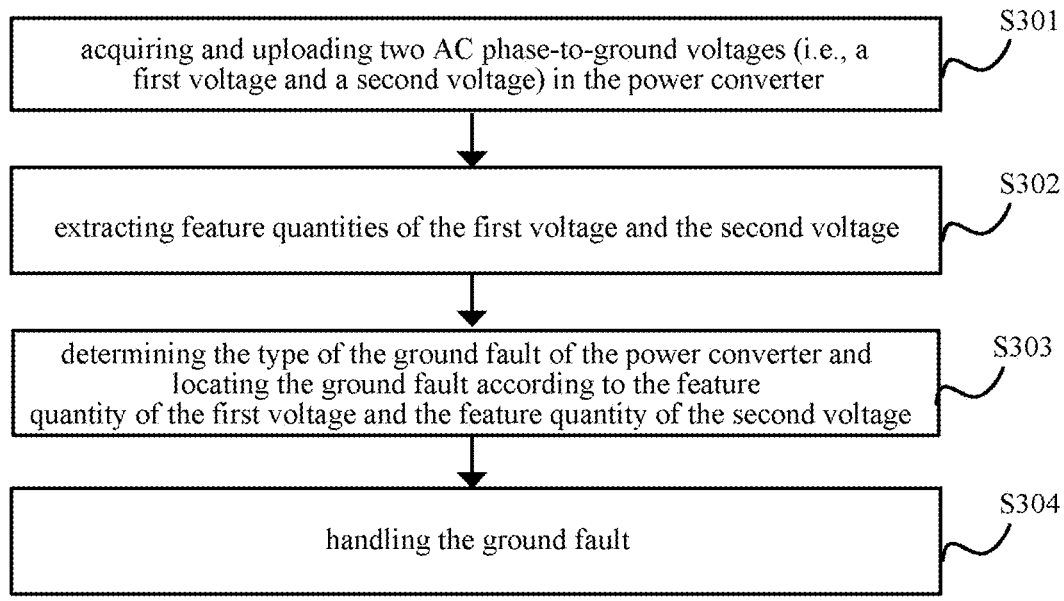
FIG. 3 is a flow chart of a ground fault detection method according to a first embodiment of the present disclosure.

An exemplary embodiment of the present disclosure provides a method of implementing the above-described detection and location of an AC ground fault d a DC ground fault. FIG. 3 is a flow chart of a ground fault detection method according to the first embodiment of the present disclosure.

In this embodiment, the power converter 1 includes a rectifier circuit 2, a bus capacitor 4, and an inverter circuit 6, as shown in FIG. 2. The rectifier circuit 2 is electrically coupled to the grid 8 via the switch group 7, and the bus capacitor 4 is electrically coupled between the rectifier circuit 2 and the inverter circuit 6. The AC phase of the inverter circuit 6 is electrically coupled to the motor 9. The AC phase of the inverter circuit 6 includes a first phase, a second phase, and a third phase, i.e., an A phase, a B phase, and a C phase. The power converter 1 further includes a voltage sensor 3 and a controller 5. The voltage sensor 3 is a dual-input voltage sensor. The two input terminals of the voltage sensor 3 are respectively connected to two phases of the A phase, the B phase and the C phase and the output terminal of the voltage sensor 3 is connected to the controller 5.

The structure of the voltage sensor is as shown in FIG. 10. The voltage sensor 3 includes a voltage dividing circuit 31, a differential circuit 32, and an AD conversion circuit 33. The voltage dividing circuit 31 is connected to two of the A phase, the B phase, and the C phase of the power converter 1, to respectively measure two AC phase-to-ground voltages (phase voltages), i.e. a first voltage and a second voltage. The differential circuit 32 receives a first voltage and a second voltage, performs common mode noise suppression processing, and respectively outputs a first differential voltage signal and a second differential voltage. The AD conversion circuit 33 is connected to the differential circuit 32, receives the first differential voltage signal and the second differential voltage signal and digitally encodes the first differential voltage signal and the second differential voltage signal, and then outputs the first digital voltage signal and the second digital voltage signal to the controller 5. The first digital voltage signal and the second digital voltage signal are Manchester codes, and the Manchester codes may effectively improve the anti-interference ability of the signal.

As shown in FIG. 3, the ground fault detection method may include the following steps.

In step S301, Acquiring and uploading the phase voltages of the two AC phases in the power converter 1. First, the voltage sensor 5 respectively measures the two AC phase-to-ground voltages (phase voltages) in the power converter, that is, the first voltage and the second voltage. The voltage dividing resistor and the differential circuit of the voltage sensor (as shown in FIG. 10) adjust and filter the first voltage and the second voltage. Then, the differential circuit outputs the first differential voltage signal and the second differential voltage signal to the AD conversion circuit, respectively. Finally, the AD conversion circuit converts the first differential voltage signal and the second differential voltage signal into a first digital voltage signal and a second digital voltage signal, respectively, wherein the first digital voltage signal and the second digital voltage signal are Manchester codes. The first digital voltage signal and the second digital voltage signal are uploaded to the controller 5. The Manchester codes may effectively improve the anti-interference ability of the signal.

In step S302, extracting feature quantities of the first voltage and the second voltage. Firstly, the voltage sensor 3 collects the instantaneous value of the AC phase-to-ground voltage (phase voltage) and converts the instantaneous value of the AC phase-to-ground voltage into a digital quantity. Secondly, the controller calculates a sum and a square sum of the instantaneous values of the phase voltages according to the received digital quantities, and then calculates an average value of the sum and a root mean square for a cycle according to the operating frequency of the motor. In this way, the average value of the phase voltage and the effective value of the phase voltage can be correctly extracted during the dynamic change process of the motor frequency.

Specifically, the controller 5 includes a feature quantity extracting unit 51, a logic determining unit 52 and a pulse processing unit 53. The feature quantity extracting unit 51 receives the first digital voltage signal and the second digital voltage signal, and extracts a corresponding feature quantity of the first voltage and a corresponding feature quantity of the second voltage according to the first digital voltage signal and the second digital voltage signal. The feature quantity of the first voltage includes an average value or an effective value of the first voltage, and the feature quantity of the second voltage includes an average value or an effective value of the second voltage.

In this embodiment, receiving, by the controller 5, the first digital voltage signal and the second digital voltage signal, and extracting a corresponding feature quantity of the first voltage and a corresponding feature quantity of the second voltage according to the first digital voltage signal and the second digital voltage signal includes: calculating, by the controller 5, an average value of the first digital voltage to acquire an average value of the first voltage; or calculating a root mean square of the first digital voltage signal by the controller 5 to obtain an effective value of the first voltage; and calculating, by the controller 5, an average value of the second digital voltage to acquire an average value of the second voltage; or calculating a root mean square of the second digital voltage signal by the controller 5 to obtain an effective value of the second voltage. Specifically, the feature quantity extracting unit 51 in the controller 5 calculates an average value of the received first digital voltage to acquire an average value of the first voltage, or the feature quantity extracting unit 51 in the controller 5 calculates a root mean square of the received first digital voltage signal to obtain an effective value of the first voltage. The feature quantity extracting unit 51 in the controller 5 calculates an average value of the received second digital voltage to acquire an average value of the second voltage, or the feature quantity extracting unit 51 in the controller 5 calculates a root mean square of the received second digital voltage signal to obtain an effective value of the second voltage.

In step S303, determining the type of the ground fault of the power converter and locating the ground fault according to the feature quantity of the first voltage and the feature quantity of the second voltage. Determining the type of the ground fault of the power converter and locating the ground fault according to the feature quantity of the first voltage and the feature quantity of the second voltage includes: determining and locating the AC ground fault according to the effective value of the first voltage and the effective value of the second voltage, or determining and locating the DC ground fault according to the average value of the first voltage and the average value of the second voltage. Specifically, the logic determining unit 52 receives the feature quantity of the first voltage and the feature quantity of the second voltage, and determines that an AC ground fault occurs and accurately locates the faulty AC phase according to the effective value of the first voltage and the effective value of the second voltage, or determines that a DC ground fault occurs and accurately locates the faulty terminal of the bus capacitor according to the average value of the first voltage and the average value of the second voltage.

In this embodiment, the input terminal of the voltage sensor 3 is connected to the A phase and the C phase of the power converter, and respectively measures the A phase-to-ground voltage and the C phase-to-ground voltage. In other embodiments, the input terminal of the voltage sensor 3 is connected to the B phase and the C phase of the power converter, and respectively measures the B phase-to-ground voltage and the C phase-to-ground voltage; or the input terminal of the voltage sensor 3 is connected to the A phase and the B phase of the power converter, and respectively measures the A phase-to-ground voltage and the B phase-to-ground voltage. In this embodiment, the A phase and the C phase of the power converter are connected to the input terminal of the voltage sensor 3 as an example, but the present disclosure is not limited thereto.

When the effective value of the A phase-to-ground voltage (i.e., the first voltage) is significantly decreased and smaller than a first preset value, and the effective value of the C phase-to-ground voltage the second voltage) is increased and is larger than a second preset value, the logic determining unit 52 may determine and locate that a ground fault has occurred at the A phase, that is, an AC ground fault has occurred at the A phase. When the effective value of the A phase-to-ground voltage is increased and is larger than the second preset value, and the effective value of the C phase-to-ground voltage is increased and is larger than the second preset value, the logic determining unit 52 may determine and locate that a ground fault has occurred at the B phase, that is, an AC ground fault has occurred at the B phase. When the effective value of the A phase-to-ground voltage significantly is increased and is larger than the second preset value, and the effective value of the C phase-to-ground voltage is decreased and smaller than the first preset value, the logic determining unit 52 may determine and locate that a ground fault has occurred at the C phase, that is an AC ground fault has occurred at the C phase. When each of the average value of the A phase-to-ground voltage and the average value of the C phase-to-ground voltage is smaller than a third preset value, the logic determining unit 52 may determine and locate that a ground fault has occurred at the positive terminal of the bus capacitor, that is, a DC ground fault has occurred at the positive terminal of the bus capacitor. When each of the average value of the A phase-to-ground voltage and the average value of the C phase-to-ground voltage is larger than a fourth preset value, the logic determining unit 52 may determine and locate that a ground fault has occurred at the negative terminal of the bus capacitor, that is, a DC ground fault has occurred at the negative terminal of the bus capacitor. The first preset value, the second preset value, the third preset value, and the fourth preset value may be flexibly set according to the range of the ground resistance to be measured.

Figure 5:
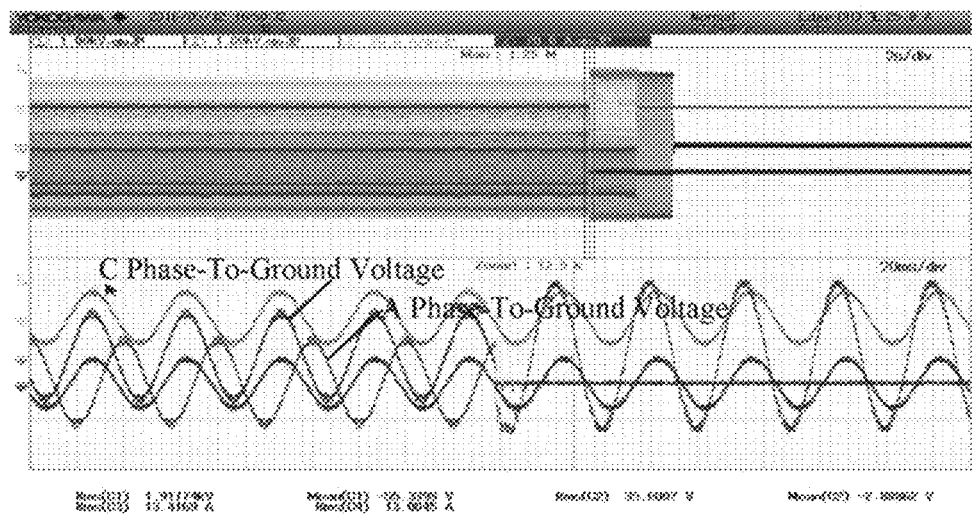
FIG. 5 is a waveform diagram of an A-phase ground fault.
Figure 6:
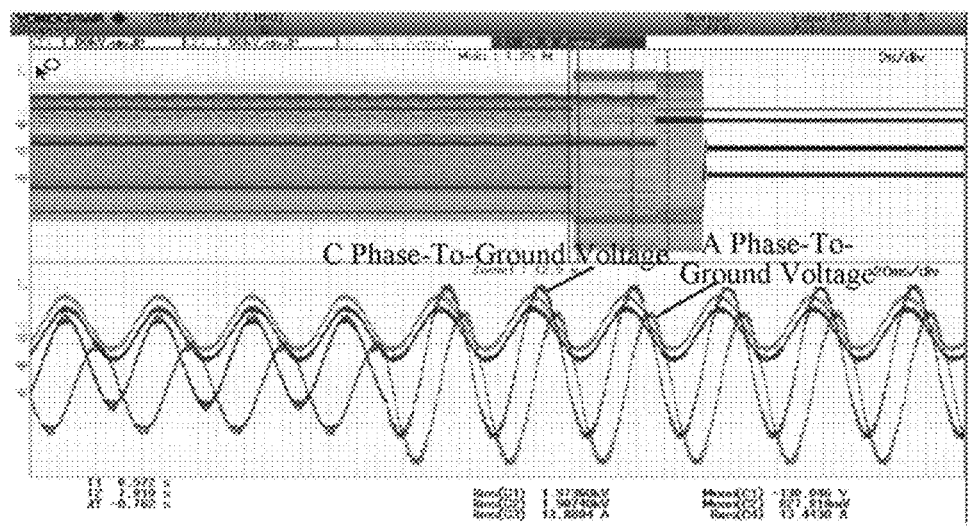
FIG. 6 is a waveform diagram of a B-phase ground fault.
Figure 7:
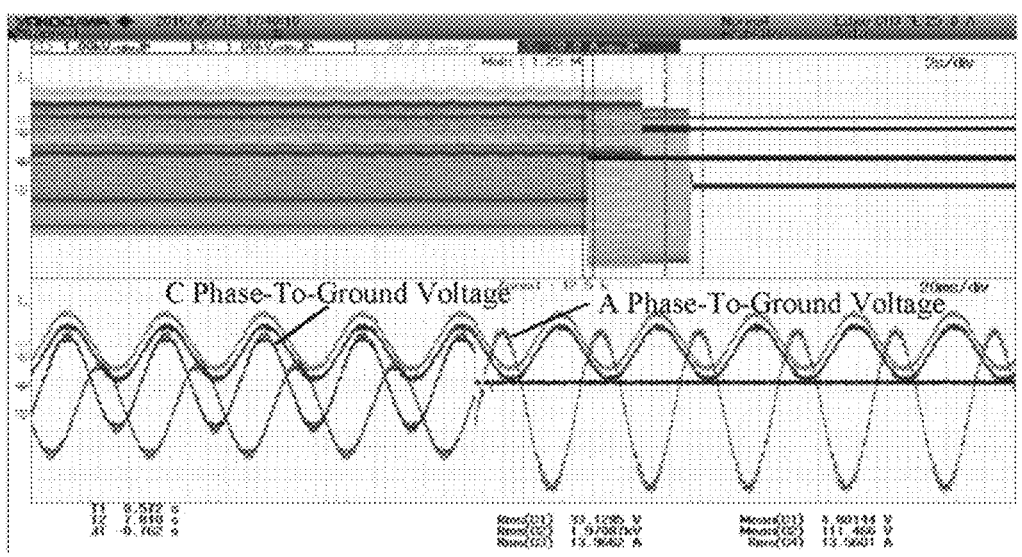
FIG. 7 is a waveform diagram of a C-phase ground fault.
Figure 8:
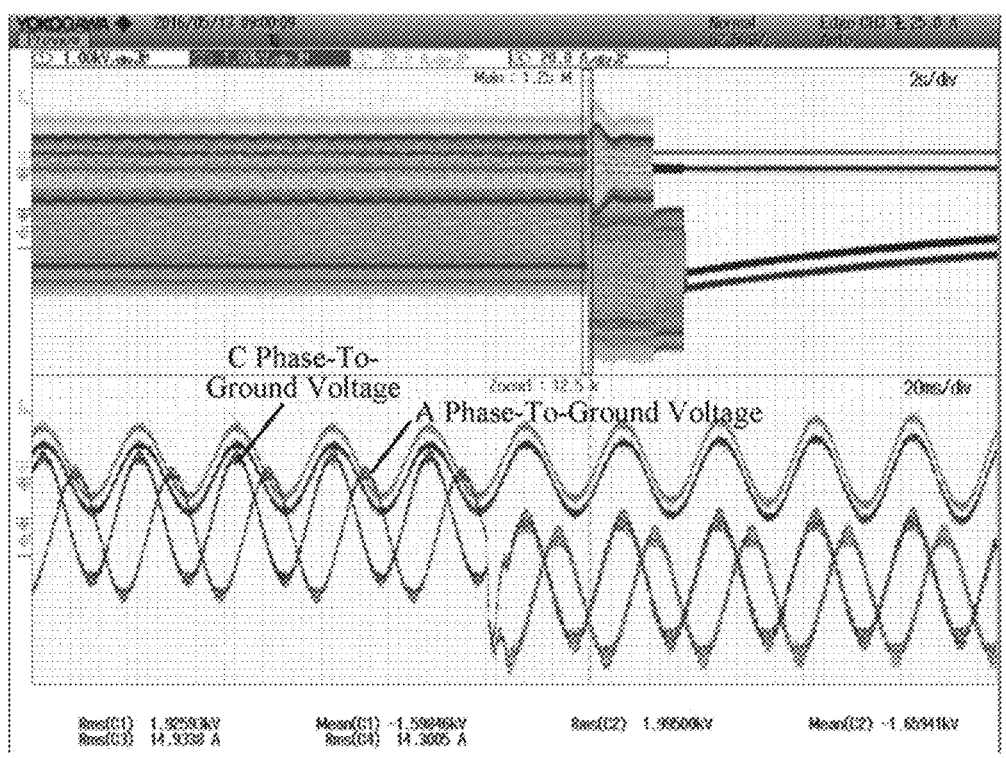
FIG. 8 is a waveform diagram of a ground fault at a positive terminal of a bus capacitor.
Figure 9:
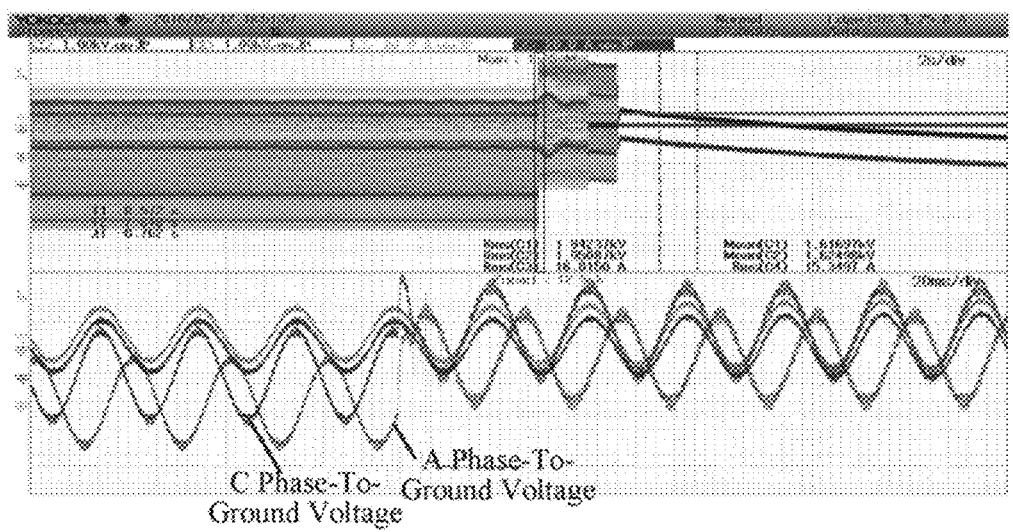
FIG. 9 is a waveform diagram of a ground fault at a negative terminal of a bus capacitor.

The above determination of the type of the ground fault and location of the ground fault may be performed by the logic determining unit 52 in the controller 5 as shown in FIGS. 1 and 2. FIG. 4 shows an example in which the controller determines the type of the ground fault and locates the ground fault, in which a symbol "U" indicates the phase voltage. It should be understood that the various types of preset values shown in FIG. 4 are merely exemplary and may be set according to actual needs without limiting the present disclosure in any manner. In addition, FIG. 5 shows a waveform diagram of an A phase ground fault; FIG. 6 is a waveform diagram of a B phase ground fault; FIG. 7 is a waveform diagram of a C phase ground fault of the motor; FIG. 8 is a waveform diagram of a ground fault at a positive terminal of a bus capacitor; and FIG. 9 is a waveform diagram of a ground fault at a negative terminal of a bus capacitor.

Referring to FIG. 4, as an example for illustration purpose, the A phase-to-ground voltage is taken as the first voltage and the C phase-to-ground voltage is taken as the second voltage. As shown in FIG. 4, determining and locating an AC ground fault according to the effective value of the first voltage and the effective value of the second voltage includes: when the effective value of the first voltage is <0.8*U, where U denotes the voltage of the phase voltage, and the effective value of the second voltage is >1.2*U, determining and locating that an AC ground fault has occurred at the A phase. The waveforms of the A phase-to-ground voltage and the C phase-to-ground voltage are as shown in FIG. 5. When the effective value of the first voltage is >1.2*U, and the effective value of the second voltage is >1.2*U, it may be determined and located that an AC ground fault has occurred at the B phase. The waveforms of the A phase-to-ground voltage and the C phase-to-ground voltage are as shown in FIG. 6. When the effective value of the first voltage is >1.2*U, and the effective value of the second voltage is <0.8*U, it may be determined and located that an AC ground fault has occurred at the C phase. The waveforms of the A phase-to-ground voltage and the C phase-to-ground voltage are as shown in FIG. 7. Determining and locating a DC ground fault according to the average value of the first voltage and the average value of the second voltage includes: when the average value of the first voltage is <−0.3*0.5 Udc and the average value of the second voltage is <−0.3*0.5 Udc, where Udc denotes the DC bus voltage value, determining that a ground fault has occurred at the positive terminal of the bus capacitance. The waveforms of the A phase-to-ground voltage and the C phase-to-ground voltage are as shown in FIG. 8. When the average value of the first voltage is >0.3*0.5 Udc and the average value of the second voltage is >0.3*0.5 Udc, it may be determined that a ground fault has occurred at the negative terminal of the bus capacitance. The waveforms of the A phase-to-ground voltage and the C phase-to-ground voltage are as shown in FIG. 9.

In other embodiments, the input terminal of the voltage sensor 3 may be connected to the A phase and the C phase of the power converter for measuring the A phase-to-ground voltage and the C phase-to-ground voltage. The voltage sensor is a dual-input voltage sensor or a combination of two single-input voltage sensors. Then, the voltage sensor 3 converts the two phase voltages into a first digital voltage signal and a second digital voltage signal and transmits them to the controller 5. The controller 5 may calculate and extract the effective value and the average value of the A phase-to-ground voltage, the effective value and the average value of the B phase-to-ground voltage and the effective value and the average value of the C phase-to-ground voltage according to the first digital voltage signal and the second digital voltage signal. Alternatively, the input terminal of the voltage sensor 3 may be connected to the A phase, the B phase and the C phase of the converter respectively, for measuring the A phase-to-ground voltage, the B phase-to-ground voltage and the C phase-to-ground voltage. The voltage sensor is a three-input voltage sensor or a combination of three single-input voltage sensor. Then, the voltage sensor 3 converts the three phase voltages into a first digital voltage signal, a second digital voltage signal and a third digital voltage signal, and transmits them to the controller 5. The controller 5 may calculate and extract the effective value and the average value of the A phase-to-ground voltage, the effective value and the average value of the B phase-to-ground voltage and the effective value and the average value of the C phase-to-ground voltage according to the first digital voltage signal, the second digital voltage signal and the third digital voltage signal. When the effective value of the A phase-to-ground voltage is significantly decreased, and the effective values of the B phase-to-ground voltage and the C phase-to-ground voltage are increased, it may be determined that a ground fault has occurred at the A phase, that is, an AC ground fault has occurred at the A phase. When the effective value of the A phase-to-ground voltage is significantly increased, and for one of the B phase and the C phase, the effective value and the phase-to-ground voltage is increased, and for the other of the B phase and the C phase, the effective value and the phase-to-ground voltage is decreased, it may be determined that an AC ground fault has occurred at the said other phase of the B phase and the C phase. When each of the average values of the A, B, C phase-to-ground voltages is significantly increased and larger than the fourth preset value, it may be determined that a DC ground fault has occurred at the negative terminal of the bus capacitor. When each of the average values of the A, B, C phase-to-ground voltages is significantly decreased and smaller than the third preset value, it may be determined that a DC ground fault has occurred at the positive terminal of the bus capacitor.

At step S304, handling the ground fault. First, the control signal output by the controller 5 is blocked. That is, when the logic determining unit 52 in the controller 5 determines that an AC ground fault or a DC ground fault has occurred in the power converter according to the feature quantity of the first voltage and the feature quantity of the second voltage, the pulse processing unit 53 blocks the control signal to turn off the power semiconductor switch in the rectifier circuit 2 and the inverter circuit 6 and in turn, shut down the rectifier circuit 2 and the inverter circuit 6. Then, the controller 5 outputs a trip signal to turn off the switch group. Specifically, the logic determining unit 52 outputs a trip signal to the actuator unit 10, such as a switch panel. Then, the actuator unit 10 controls the switch group to be turned off, such that the rectifier circuit 2 in the power converter is disconnected from the grid 8. The switch group may be a circuit breaker.

Another exemplary is provided to facilitate full understanding of the principle of the present disclosure. This embodiment provides a power converter with a ground fault detection function. The power converter includes a rectifier circuit 2, a bus capacitor 4, and an inverter circuit 6. One side of the rectifier circuit 2 is electrically coupled to the switch group 7. The switch group 7 is electrically coupled to the grid 8. The bus capacitor 4 is electrically coupled between the other side of the rectifier circuit 2 and one side of the inverter circuit 6. AC phases of the other side of the inverter circuit 6 are electrically coupled to the motor 9. The AC phases of the inverter circuit 6 include a first phase, a second phase and a third phase, i.e., A phase, B phase and C phase. The power converter further includes a voltage sensor 3 and a controller 5. The voltage sensor 3 has an input terminal electrically coupled to two of the first phase, the second phase and the third phase of the inverter circuit 6 respectively, and an output terminal of the voltage sensor 3 coupled to the controller 5.

The structure of the voltage sensor 3 is as shown in FIG. 10. The voltage sensor 3 includes a voltage dividing circuit 31, a differential circuit 32 and an AD conversion circuit 33. The voltage dividing circuit 31 is respectively connected to two phases of the A phase, the B phase and the C phase of the power converter, to respectively measure two AC phase-to-ground voltages, i.e. a first voltage and a second voltage, and outputs a first divided voltage and a second divided voltage. The differential circuit 32 receives the first divided voltage and the second divided voltage, and the first divided voltage and the second divided voltage are subjected to common mode noise suppression processing, respectively outputting a first differential voltage signal and a second differential voltage signal. The AD conversion circuit 33 is connected to the differential circuit 32 to receive and digitally encode the first differential voltage signal and the second differential voltage signal, and then outputs a first digital voltage signal and a second digital voltage signal to the controller 5. The first digital voltage signal and the second digital voltage signal are Manchester, and the Manchester code may effectively improve the anti-interference ability of the signal.

The controller 5 receives the first digital voltage signal and the second digital voltage signal output by the voltage sensor 3, and extracts a feature quantity of the first voltage and a feature quantity of the second voltage according to the first digital voltage signal and the second digital voltage signal, and determines the type of the ground fault of the power converter and locate the ground fault according to the feature quantity of the first voltage and the feature quantity of the second voltage. When the power converter has a ground fault, the control signal output by the controller may be blocked and the power converter is shut down. That is, the controller 5 controls the power semiconductor switch in the rectifier circuit 2 and the inverter circuit 6 to be turned off to perform shutdown processing on the rectifier circuit 2 and the inverter circuit 6. After the rectifier circuit 2 and the inverter circuit 6 are shut down, the controller 5 outputs a trip signal to the switch group 7 to disconnect the switch group 7 so that the rectifier circuit 2 in the power converter is disconnected from the grid 8. The switch group 7 may be a circuit breaker.

The controller 5 calculates an average value of the first digital voltage signal to obtain an average value of the first voltage. Alternatively, the controller 5 calculates a root mean square of the first digital voltage signal to obtain an effective value of the first voltage. The controller 5 calculates an average value of the second digital voltage signal to obtain an average value of the second voltage. Alternatively, the controller 5 calculates a root mean square of the second digital voltage signal to obtain an effective value of the second voltage. Specifically, the controller 5 includes a feature quantity extracting unit 5f, a logic determining unit 52 and a pulse processing unit 53. The feature quantity extracting unit 51 receives the first digital voltage signal and the second digital voltage signal, and extracts a corresponding feature quantity of the first voltage and a corresponding feature quantity of the second voltage according to the first digital voltage signal and the second digital voltage signal. For example, the feature quantity extracting unit 51 calculates an average value of the first digital voltage signal to obtain an average value of the first voltage; or the feature quantity extracting unit 51 calculates a root mean square of the first digital voltage signal to obtain an effective value of the first voltage. The feature quantity extracting unit 51 calculates an average value of the second digital voltage signal to obtain an average value of the second voltage; or the feature quantity extracting unit 51 calculates a root mean square of the second digital voltage signal to obtain an effective value of the second voltage.

The controller 5 may determine and locate the AC ground fault according to the effective value of the first voltage and the effective value of the second voltage, and may also determine and locate the DC ground fault according to the average value of the first voltage and the average value of the second voltage. Specifically, the logic determining unit 52 in the controller 5 determines and locates the AC ground fault according to the effective value of the first voltage and the effective value of the second voltage, and may also determine and locate the DC ground fault according to the average value of the first voltage and the average value of the second voltage.

When the logic determining unit 52 determines that the power converter has a ground fault, the pulse processing unit 53 blocks the control signal to shut down the power converter.

In this embodiment, the input terminal of the voltage sensor 3 is connected to the A phase and the C phase of the power converter, and the voltage sensor 3 is a dual-input voltage sensor, but is not limited thereto. The voltage sensor 3 is connected to the controller 5 through an optical fiber to achieve high voltage isolation. The voltage sensor 3 measures A phase-to-ground voltage and C phase-to-ground voltage, respectively, where the A phase-to-ground voltage is taken as the first ground voltage and the C phase-to-ground voltage is taken as the second voltage. For example, when the effective value of the first voltage extracted by the controller 5 is smaller than the first preset value, and the effective value of the second voltage is larger than the second preset value, the controller determines and locates that an AC ground fault has occurred at the A phase with respect to the ground. When the effective value of the first voltage is larger than the second preset value, and the effective value of the second voltage is larger than the second preset value, the controller 5 determines and locates that an AC ground fault has occurred at the B phase with respect to the ground. When the effective value of the first voltage is larger than the second preset value, and the effective value of the second voltage is smaller than the first preset value, the controller 5 determines and locates that an AC ground fault has occurred at the C phase with respect to the ground. When the average value of the first voltage and the average value of the second voltage are both smaller than the third preset value, the controller 5 determines and locates that the positive terminal of the bus capacitor 4 has a DC ground fault. When the average value of the first voltage and the average value of the second voltage are both larger than the fourth preset value, the controller 5 determines and locates that a DC ground fault occurs at the negative terminal of the bus capacitor 4. The first preset value, the second preset value, and the third preset and the fourth preset value may be flexibly set according to the range of the grounding resistance to be measured.

The above determination of the type of the ground fault and location of the ground fault may be performed by the controller as shown in FIG. 2. FIG. 4 shows an example in which the controller determines the type of the ground fault and locates the ground fault. It should be understood that the various types of preset values shown in FIG. 4 are merely exemplary and may be set according to actual needs without limiting the present disclosure in any manner. In addition, FIG. 5 shows a waveform diagram of an A phase ground fault; FIG. 6 is a waveform diagram of a B phase ground fault; FIG. 7 is a waveform diagram of a C phase ground fault of the motor; FIG. 8 is a waveform diagram of a ground fault at a positive terminal of a bus capacitor; and FIG. 9 is a waveform diagram of a ground fault at a negative terminal of a bus capacitor.

Referring to FIG. 4, as an example for illustration purpose, the A phase-to-ground voltage is taken as the first voltage and the C phase-to-ground voltage is taken as the second voltage. As shown in FIG. 4, determining and locating an AC ground fault according to the effective value of the first voltage and the effective value of the second voltage includes: when the effective value of the first voltage is <0.8*U, where U denotes the voltage of the phase voltage, and the effective value of the second voltage is >1.2*U, determining and locating that an AC ground fault has occurred at the A phase. The waveforms of the A phase-to-ground voltage and the C phase-to-ground voltage are as shown in FIG. 5. When the effective value of the first voltage is >1.2*U, and the effective value of the second voltage is >1.2*U, it may be determined and located that an AC ground fault has occurred at the B phase. The waveforms of the A phase-to-ground voltage and the C phase-to-ground voltage are as shown in FIG. 6. When the effective value of the first voltage is >1.2*U, and the effective value of the second voltage is <0.8*U, it may be determined and located that an AC ground fault has occurred at the C phase. The waveforms of the A phase-to-ground voltage and the C phase-to-ground voltage are as shown in FIG. 7. Determining and locating a DC ground fault according to the average value of the first voltage and the average value of the second voltage includes: when the average value of the first voltage is <−0.3*0.5 Udc and the average value of the second voltage is <−0.3*0.5 Udc, where Udc denotes the DC bus voltage value, determining that a DC ground fault has occurred at the positive terminal of the bus capacitance. The waveforms of the A phase-to-ground voltage and the C phase-to-ground voltage are as shown in FIG. 8. When the average value of the first voltage is >0.3*0.5 Udc and the average value of the second voltage is >0.3*0.5 Udc, it may be determined and located that a DC ground fault has occurred at the negative terminal of the bus capacitance. The waveforms of the A phase-to-ground voltage and the C phase-to-ground voltage are as shown in FIG. 9.

According to the present disclosure, in the ground fault detection method, the average value or the effective value of the two AC phase-to-ground voltages (i.e., phase currents) of the power converter is used as the feature quantities to determine the type of the ground fault and locate the ground fault. It can not only reduce the detection dead zone, but also effectively locate the ground fault, to facilitate the fault inspection. The improved power converter provided by the present disclosure utilizes the voltage sensor of the power converter to respectively measure two AC phase-to-ground voltages (i.e. two phase voltages) of the power converter, and to extract feature quantities of the two AC phase-to-ground voltages. It can realize the determination of the type of the ground fault and the location of the ground fault.

The flow charts and block diagrams in the above-described accompanying drawings illustrate the architecture, functionality, and operation of possible implementations of the device, the method, and the apparatus according to various embodiments of the present application. Each block in the flow charts or block diagrams may represent a module, a circuit, a program segment, or executable instruction for implementing the specified logical function. It should be noted that in some alternative implementations, the functions illustrated in the blocks may also occur in a different order than those illustrated in the drawings. For example, two blocks shown in an order may in fact be performed substantially in parallel, and they may sometimes be performed in a reverse order, depending upon the functionality involved. It is also noted that each block of the block diagrams or flow charts, and combinations of blocks in the block diagrams or flow charts, may be implemented in a hardware-based system or a circuit that performs the specified function or operation, or may be implemented by combination of dedicated hardware and computer instructions.

The modules or units involved in the embodiments of the present application may be implemented by software or by hardware. Those skilled in the art will appreciate that all or part of the steps of the above-described embodiments may be implemented as a computer program or instructions executed by a CPU. When the computer program is executed by the CPU, the above-described functions defined by the above method provided by the present disclosure are performed. Such a program or instructions may be stored in a computer readable storage medium, which may be a read only memory, a magnetic disk or an optical disk or the like.

Further, it should be noted that the above-described drawings are merely illustrative of the processes included in the method according to the exemplary embodiments of the present disclosure, and are not intended to be limiting, and the processes shown in the accompanying drawings do not indicate or limit the order of the processes. In addition, it is to be understood that these processes may be performed synchronously or asynchronously unless otherwise stated.

The exemplary embodiments of the present disclosure have been particularly shown and described above. It is to be understood that the present disclosure is not limited to the details of the details of the present disclosure, and the scope of the present disclosure is defined by the appended claims.

What is claimed is:

1. A ground fault detection method for a power converter, the power converter comprising a rectifier circuit, a bus capacitor, and an inverter circuit; the rectifier circuit being electrically coupled to a switch group, and the switch group being electrically coupled to a grid; the bus capacitor being electrically coupled between the rectifier circuit and the inverter circuit; AC phases of the inverter circuit being electrically coupled to a motor; the power converter further comprising a voltage sensor and a controller; an input terminal of the voltage sensor being electrically coupled to the AC phases of the inverter circuit; an output terminal of the voltage sensor being electrically coupled to the controller; and the method comprising:
measuring, by the voltage sensor, a first voltage and a second voltage, respectively, and converting the first voltage and the second voltage into a first digital voltage signal and a second digital voltage signal; and
receiving, by the controller, the first digital voltage signal and the second digital voltage signal, extracting a corresponding feature quantity of the first voltage and a corresponding feature quantity of the second voltage according to the first digital voltage signal and the second digital voltage signal; and determining a type of a ground fault of the power converter and locating a ground fault according to the feature quantity of the first voltage and the feature quantity of the second voltage; and when the power converter has a ground fault, shutting down the power converter.

2. The method according to claim 1, wherein:
the AC phases of the inverter circuit comprises a first phase, a second phase and a third phase;
the voltage sensor comprises a voltage dividing circuit, a differential circuit and an AD conversion circuit, the voltage dividing circuit being respectively connected to two of the first phase, the second phase and the third phase, to respectively measure the first voltage and the second voltage and output a first divided voltage and a second divided voltage;
the differential circuit receives the first divided voltage and the second divided voltage, performs common mode noise suppression processing, and respectively outputs a first differential voltage signal and a second differential voltage signal; and
the AD conversion circuit is coupled to the differential circuit, receives the first differential voltage signal and the second differential voltage signal and performs digital encoding on the first differential voltage signal and the second differential voltage signal, and outputs the first digital voltage signal and the second digital voltage signal.

3. The method according to claim 2, wherein:
the feature quantity of the first voltage comprises an average value or an effective value of the first voltage, and the feature quantity of the second voltage comprises an average value or an effective value of the second voltage.

4. The method according to claim 3, wherein receiving, by the controller, the first digital voltage signal and the second digital voltage signal, extracting a corresponding feature quantity of the first voltage and a corresponding feature quantity of the second voltage according to the first digital voltage signal and the second digital voltage signal comprises:
calculating, by the controller, an average value of the first digital voltage signal to obtain the average value of the first voltage; or calculating, by the controller, a root mean square of the first digital voltage signal to obtain the effective value of the first voltage; and
calculating, by the controller, an average value of the second digital voltage signal to obtain the average value of the second voltage; or calculating, by the controller, a root mean square of the second digital voltage signal to obtain the effective value of the second voltage.

5. The method according to claim 4, wherein determining a type of a ground fault of the power converter and locating a ground fault according to the feature quantity of the first voltage and the feature quantity of the second voltage comprises:
determining and locating an AC ground fault according to the effective value of the first voltage and the effective value of the second voltage; or determining and locating a DC ground fault according to the average value of the first voltage and the average value of the second voltage.

6. The method according to claim 5, wherein the voltage dividing circuit is coupled to the first phase and the third phase, respectively, and determining and locating an AC ground fault according to the effective value of the first voltage and the effective value of the second voltage comprises:
determining and locating that the AC ground fault has occurred at the first phase of the inverter circuit when the effective value of the first voltage is smaller than a first preset value, and the effective value of the second voltage is larger than a second preset value; or
determining and locating that the AC ground fault has occurred at the second phase of the inverter circuit when the effective value of the first voltage is larger than the second preset value, and the effective value of the second voltage is larger than the second preset value; or
determining and locating that the AC ground fault has occurred at the third phase of the inverter circuit when the effective value of the first voltage is larger than the second preset value, and the effective value of the second voltage is smaller than the first preset value.

7. The method according to claim 5, wherein determining and locating a DC ground fault according to the average value of the first voltage and the average value of the second voltage comprises:
determining and locating that the DC ground fault has occurred at a positive terminal of the bus capacitor when the average value of the first voltage and the average value of the second voltage are both smaller than a third preset value; or
determining and locating that the DC ground fault has occurred at a negative terminal of the bus capacitor when the average value of the first voltage and the average value of the second voltage are both larger than a fourth preset value.

8. The method according to claim 1, further comprising outputting, by the controller, a trip signal to turn off the switch group.

9. The method according to claim 1, wherein the voltage sensor is a dual-input voltage sensor, and wherein the digital encoding is Manchester encoding.

10. A power converter provided with a ground fault detection function, comprising:
a rectifier circuit electrically coupled to a switch group, and the switch group being electrically coupled to a grid;
a bus capacitor electrically coupled between the rectifier circuit and an inverter circuit;
the inverter circuit, AC phases of the inverter circuit being electrically coupled to a motor, and the AC phases of the inverter circuit comprising a first phase, a second phase and a third phase;
a voltage sensor, an input terminal of the voltage sensor being electrically coupled to two of the first phase, the second phase and the third phase; and
a controller electrically coupled to an output terminal of the voltage sensor,
wherein:
the voltage sensor is configured to measure a first voltage and a second voltage, respectively, and convert the first voltage and the second voltage into a first digital voltage signal and a second digital voltage signal; and
the controller is configured to receive the first digital voltage signal and the second digital voltage signal, extract a corresponding feature quantity of the first voltage and a corresponding feature quantity of the second voltage according to the first digital voltage signal and the second digital voltage signal; and determine a type of a ground fault of the power converter and locate a ground fault according to the feature quantity of the first voltage and the feature quantity of the second voltage; and when the power converter has the ground fault, shut down the power converter.

11. The power converter according to claim 10, wherein:
the voltage sensor comprises a voltage dividing circuit, a differential circuit, and an AD conversion circuit;
the voltage dividing circuit is respectively connected to two of the first phase, the second phase and the third phase, to respectively measure the first voltage and the second voltage and output a first divided voltage and a second divided voltage;
the differential circuit is configured to receive the first divided voltage and the second divided voltage, perform common mode noise suppression processing, and respectively output a first differential voltage signal and a second differential voltage signal;
the AD conversion circuit is coupled to the differential circuit, and configured to receive the first differential voltage signal and the second differential voltage signal and perform digital encoding on the first differential voltage signal and the second differential voltage signal, and output the first digital voltage signal and the second digital voltage signal; and
the feature quantity of the first voltage comprises an average value or an effective value of the first voltage, and the feature quantity of the second voltage comprises an average value or an effective value of the second voltage.

12. The power converter according to claim 11, wherein the controller is configured to:
calculate an average value of the first digital voltage signal to obtain the average of the first voltage, or calculate a root mean square of the first digital voltage signal to obtain the effective value of the first voltage;
calculate an average value of the second digital voltage signal to obtain the average of the second voltage, or calculate a root mean square of the second digital voltage signal to obtain the effective value of the second voltage; and
determine and locate an AC ground fault according to the effective value of the first voltage and the effective value of the second voltage; or determine and locate a DC ground fault according to the average value of the first voltage and the average value of the second voltage.

13. The power converter according to claim 12, wherein:
the voltage dividing circuit is coupled to the first phase and the third phase, respectively;
the controller is configured to determine and locate that the AC ground fault has occurred at the first phase of the inverter circuit, when the effective value of the first voltage is smaller than a first preset value and the effective value of the second voltage is larger than a second preset value; or
the controller is configured to determine and locate that the AC ground fault has occurred at the second phase of the inverter circuit, when the effective value of the first voltage is larger than the second preset value, and the effective value of the second voltage is larger than the second preset value; or the controller is configured to determine and locate that the AC ground fault has occurred at the third phase of the inverter circuit, when the effective value of the first voltage is larger than the second preset value, and the effective value of the second voltage is smaller than the first preset value.

14. The power converter according to claim 12, wherein the controller is configured to:

determine that the DC ground fault has occurred at a positive terminal of the bus capacitor, when the average value of the first voltage and the average value of the second voltage are both smaller than a third preset value; or determine that the DC ground fault has occurred at a negative terminal of the bus capacitor, when the average value of the first voltage and the average value of the second voltage are both larger than a fourth preset value.

15. The power converter according to claim 10, wherein after the power converter is shut down, output a trip signal to disconnect the switch group.

16. The power converter according to claim 10, wherein the voltage sensor is a dual-input voltage sensor.

17. The power converter according to claim 10, wherein:
the controller comprises:
 a feature quantity extracting unit, configured to extract the corresponding feature quantity of the first voltage and the corresponding feature quantity of the second voltage according to the first digital voltage signal and the second digital voltage signal;
 a logic determining unit, configured to determine the type of the ground fault and locate the ground fault according to the feature quantity of the first voltage and the feature quantity of the second voltage; and
a pulse processing unit, configured to shut down the power converter when the ground fault of the power converter has occurred.

* * * * *